Mar. 3, 1925.

W. R. McGOWEN

BUMPER ATTACHING BRACKET

Filed Feb. 9, 1924

1,528,120

INVENTOR
William R. McGowen,
By Kay, Totten & Brown,
Attorneys.

Patented Mar. 3, 1925.

1,528,120

UNITED STATES PATENT OFFICE.

WILLIAM R. McGOWEN, OF CHICAGO, ILLINOIS.

BUMPER-ATTACHING BRACKET.

Application filed February 9, 1924. Serial No. 691,664.

*To all whom it may concern:*

Be it known that I, WILLIAM R. McGOWEN, a citizen of the United States, and resident of Chicago, in the county of Cook and State of Illinois, have invented a new and useful Improvement in Bumper-Attaching Brackets; and I do hereby declare the following to be a full, clear, and exact description thereof.

My invention relates to bumper brackets and more particularly to brackets suitable for attaching bumpers to vehicles.

One object of my invention is to provide a form of bracket that may be quickly and conveniently attached to a vehicle frame, and one wherein the position of the bracket on such frame is not likely to be shifted by shocks imposed thereagainst.

A further object of my invention is to provide a bracket wherein the strains incident to impact against the bracket are not imposed directly upon the fastening device by which the bracket is secured to the vehicle frame, and one wherein a positive unyielding abutment is provided for receiving shocks.

Still another object is to simplify and improve generally the devices of the character referred to.

Figure 1:
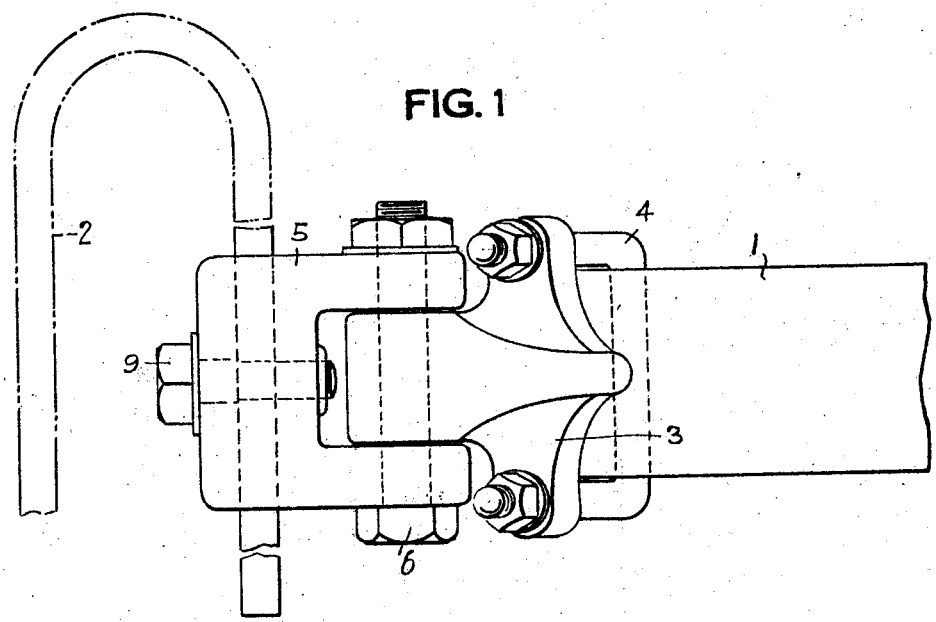
Figure 2:
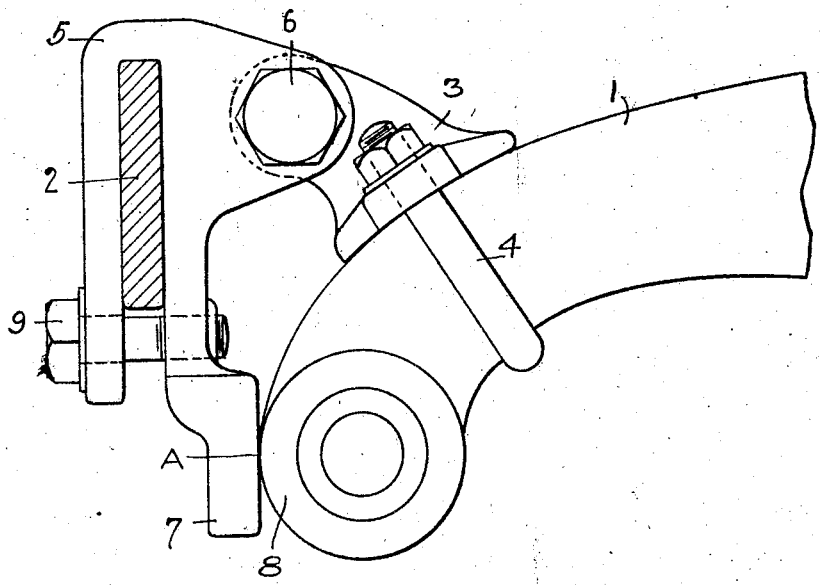

One form of my invention is shown in the accompanying drawing wherein Figs. 1 and 2 are plan and elevational views, respectively, showing my bracket and the manner in which it may be applied to the frame of an automobile or other vehicle.

In the accompanying drawing, the numeral 1 designates one of the side frames of an automobile, and the numeral 2 indicates a portion of a bumper of any conventional form such as are usually found mounted at the front and the rear ends of automobiles. It will be understood that the bumper extends across the width of the car and is supported at each end by a bracket, in the manner shown in the drawing.

The bracket comprises a base member 3 that is secured, by means of a U bolt 4, to the frame 1 and a pivoted member 5 that is secured to the base member 3 by means of a bolt 6. The member 5 is provided with a lug or boss 7 that abuts against the horn 8 of the frame 1. The bumper 2 is retained within the groove of the member 5 by a bolt 9 but may, of course, be secured thereto in any other manner.

U bolt fastenings for attaching devices of various kinds to automobiles are much favored owing to their simplicity and their adaptability to frames and brackets of various sizes and contours, but heretofore difficulty has been experienced through securing bumpers to automobile frames by means of U bolts, owing to the tendency of the bolts to become loosened and displaced. To avoid this objection, various expedients have been resorted to such as the employment of additional attaching devices, as struts, to the axle or other portion of the vehicle, etc.

Shocks imposed upon the bumper 2 and transmitted to the bracket member 5, are taken up mainly by the boss 7 and the horn 8. As the bumper bar 2 is disposed above the boss 7, the bracket member 5 tends to rotate about the point A as a center, thus transmitting a portion of the shock against the upper surface of the frame 1 in a direction substantially parallel to the legs of the U bolt 4, instead of causing such strain to be substantially parallel to the longitudinally extending portion of the frame 1 and thereby tending to displace the U bolt 4.

In most brackets, the loosening of the bolts causes displacement of the supporting brackets and renders them ineffective until they have been again set in operative position, and the bolts or other fastening devices retightened. In my form of construction, the bumper supporting brackets will usually remain in operative position even though the nuts on the bolts 4 and 6 become loosened.

The provision of a pivotal connection between the members 3 and 5 permits members 5 to be aligned vertically so that the bumper 2 will be held in proper horizontal alignment. It is apparent that, with the members 7 and 8 in engagement, movement of the base member 3 longitudinally of the frame 1, will change the angularity of the member 5.

My invention is applicable to devices other than vehicles, and various changes in detail and general arrangement may be made therein without departing from the spirit and scope of the invention as defined in the accompanying claims. For instance, the bracket members 5 and 3 may be formed integrally and the pivot bolt 6 dispensed with, or other fastening means than the U bolt 4 may be employed for maintaining the bracket in proper position upon the front of the frame 1.

What I claim is:

1. The combination with a side frame member of a vehicle, of a bracket member seated on said member and extending upwardly and forwardly to a point substantially in vertical alignment with the forward end of said frame member, a second bracket member pivotally connected at its upper end to the first named bracket member and extending downward into abutting engagement with the forward end of said frame, and means on said second bracket member for attaching a bumper bar thereto at a point above said frame end and mainly below the pivotal connection.

2. The combination with a side frame member of a vehicle, of a bracket member seated on said member and extending upwardly and forwardly, a second bracket member pivotally connected at its upper end to the first-named bracket member and extending downward into abutting engagement with the forward end of said frame, and means on said second bracket member for attaching a bumper bar thereto at a point above said frame end and mainly below the pivotal connection.

3. A bumper bracket comprising a vertically disposed member whose lower end is adapted to seat against the end of a bar and having its upper end extending to a point above said bar, a second bracket member pivotally connected to the said upper end and extending rearwardly and downwardly so that its lower end may seat on the top of said bar, and means adjacent to the mid-portion of said vertical member for attaching a bumper bar thereto.

In testimony whereof I, the said WILLIAM R. McGOWEN, have hereunto set my hand.

WILLIAM R. McGOWEN.